No. 699,782. Patented May 13, 1902.
A. H. BORGSTRÖM.
MEANS FOR VENTILATING MILK AND CREAM DURING THE PROCESS OF SEPARATION.
(Application filed May 6, 1901.)
(No Model.) 2 Sheets—Sheet 1.
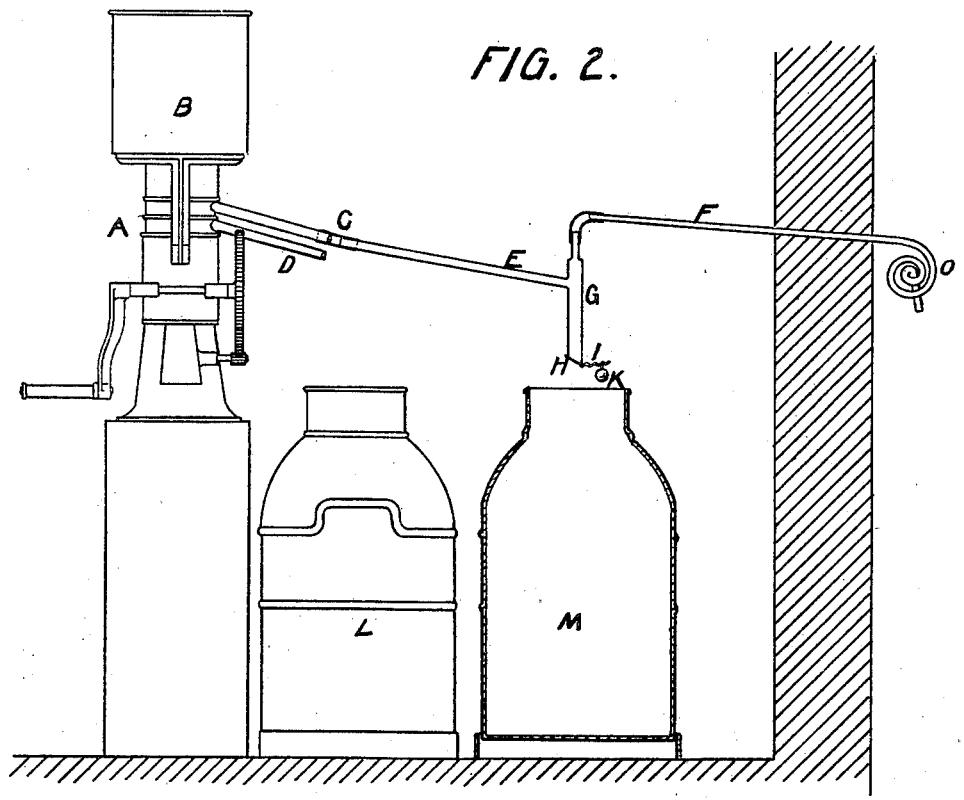
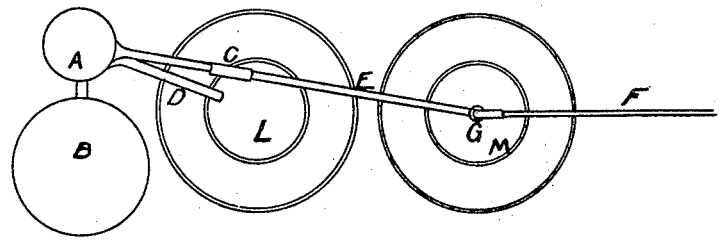

No. 699,782. Patented May 13, 1902.
A. H. BORGSTRÖM.
MEANS FOR VENTILATING MILK AND CREAM DURING THE PROCESS OF SEPARATION.
(Application filed May 6, 1901.)
(No Model.) 2 Sheets—Sheet 2.
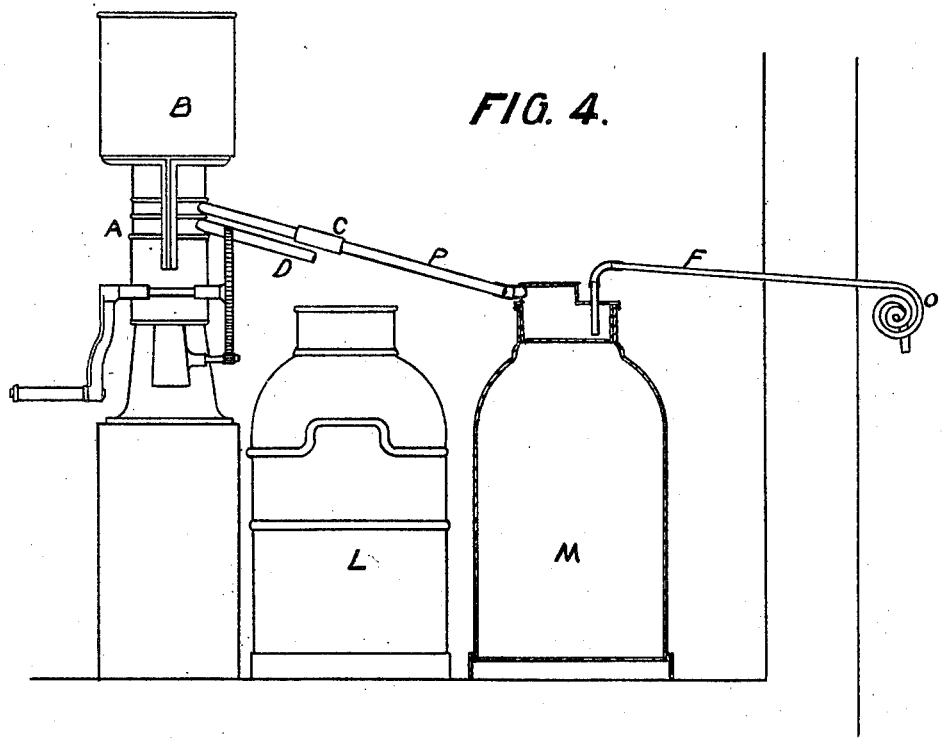
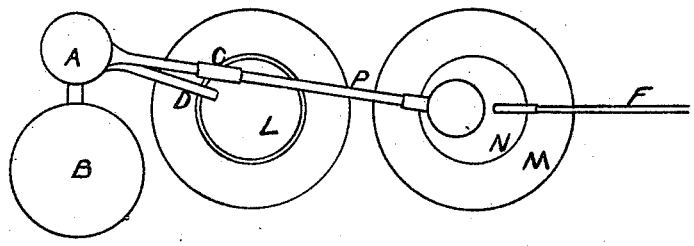
Witnesses
Margaret Barry
Anna P. McCole.
Inventor
A. H. BORGSTRÖM.
By
Edward P. Thompson
atty

UNITED STATES PATENT OFFICE.

ARTHUR HJALMAR BORGSTRÖM, OF HELSINGFORS, RUSSIA.

MEANS FOR VENTILATING MILK AND CREAM DURING THE PROCESS OF SEPARATION.

SPECIFICATION forming part of Letters Patent No. 699,782, dated May 13, 1902.

Application filed May 6, 1901. Serial No. 58,936. (No model.)

*To all whom it may concern:*

Be it known that I, ARTHUR HJALMAR BORGSTRÖM, a subject of the Emperor of Russia, residing at No. 5 Mariegatan, Helsingfors, Finland, in the Empire of Russia, have invented certain new and useful Improvements in Means for Ventilating Milk and Cream During the Process of Separation, of which the following is a specification.

My invention relates to a process and an apparatus by means of which the milk and cream in the cream-separator are protected from contact with the air in the room where the separation takes place, and at the same time air is conducted to the separator from the outer atmosphere by means of a simple arrangement of piping, thus effecting a beneficial ventilation of the milk and cream.

A ventilation of its kind certainly always takes place during the process of separation in a centrifugal cream-separator in consequence of the rapid rotation of the machine and the current of air created thereby, which causes a very thorough ventilation of the milk and cream in the separator-bowl as well as in the lids and tubes of the separator; but this ventilation though thorough cannot be admitted to be a beneficial one as it has hitherto been permitted to proceed. Even in the best-conducted dairies the air is not as pure as it should be, and at all events it is not as pure as the outer atmosphere, whereas in separating-stations and small household dairies the air is often impure to such an extent that the ventilation taking place during the separation is more injurious than beneficial.

It goes without saying that the taste and quality of the separated cream and of the butter subsequently made from the cream to a great extent depend upon the degree of purity of the air which the cream is permitted to come in contact with. If this air is impure, the cream will acquire a bad taste from it and bacteria detrimental to it obtain access to it through the medium of the impure air. Again, if the air with which the cream and milk have been in contact during and after the process of separation is pure then the cream will also remain pure.

In the separator the milk and cream undergo a very complete process of cleaning independent of the simultaneous ventilating process, inasmuch as dirt and particles of dust and other foreign substances remain as residue in the separator. The greater part of the bacteria in the milk, which, as a rule, are somewhat, though only slightly, heavier than the milk, are also thrown into the residue by the centrifugal force, in consequence of which the cream is tolerably free from bacteria when leaving the separator-bowl. It is therefore clearly quite irrational to expose the cream to the action of the more or less bacterious air of the separator-room during the separation — *i. e.*, during the time the cream runs from the separator-bowl through the cream-lid and cream-pipe and also when it drops from the cream-pipe into the receiving vessel. If, on the contrary, the cream is protected from contact with this air and is allowed to come in contact with comparatively pure air only from the outer atmosphere, the cream will remain comparatively free from bacteria.

By utilizing the current of air created in the separator by the process for the purpose of sucking fresh pure air through a system of piping into the separator an effective and beneficial ventilation can be obtained, and the foul air of the work-room is at the same time excluded from the cream. If the above-mentioned current of air be examined, it will be found that if the separator runs empty air is sucked in through the cream-pipe and through the opening where the milk is intended to enter into the machine and is ejected through the skim-milk pipe and through the waste-pipe, whereas when milk is allowed to enter the machine the suction of air will naturally cease at the inlet-opening for the milk; but ejection of air will take place as before through the skim-milk pipe and the waste-pipe, the draft at the latter two openings being strong enough to put out a lighted candle, the cream-pipe and the skim-milk pipe never being completely filled by the separated milk and cream passing through them.

The process of the draft takes place somewhat differently in different types of centrifugal cream-separators; but the chief points are always that the current of air enters into the separator through the cream-pipe and is ejected through the skim-milk pipe, which enables a beneficial ventilation to be arranged by connecting the cream-pipe with the outer atmosphere. The lids of the separator must of course be tolerably air-tight. To make this ventilating successful, it is of course necessary to prevent any air from the work-room from entering the cream-pipe through the opening from which the cream is ejected. This can be effected in two different ways, as will be described hereinafter.

In the accompanying drawings, Figure 1 shows a plan, and Fig. 2 an elevation, of a general arrangement of a centrifugal cream-separator with the piping or tubing for conducting fresh air into the cream-pipe and an appliance for the purpose of preventing the foul air of the work-room from entering the cream-pipe through the opening from which the cream is ejected. Fig. 3 shows a plan, and Fig. 4 an elevation, of a modification doing away with the special appliance at the opening of the cream-pipe, the cream being instead lead through a closed pipe direct into the lid of the vessel intended to receive it and the fresh air being sucked through the piping into the said vessel and thence to the cream-pipe of the separator.

Like letters indicate corresponding parts throughout the drawings.

A is the centrifugal cream-separator; B, the vessel on the same containing the milk to be separated.

C is the pipe through which cream is ejected from the apparatus, called the "cream-pipe," and D the pipe through which the skim-milk is ejected.

F is the piping for conducting fresh air to the cream-pipe.

L is the vessel into which the skim-milk runs, and M the one for receiving the cream.

O is a spiral at the outer end of the fresh-air pipe intended to serve as a baffle or maze for catching dust and may be replaced by some other appliance serving the same purpose.

In Figs. 1 and 2 a T-headed pipe E is shown attached to the end of the cream-pipe. The fresh-air pipe F is led to the shank of this T-pipe, and the bottom shank G is closed by a valve H, which is held in position by a balance-weight K on the lever I. The arrangement of this valve can of course be varied, its object being simply to form a certain resistance to the cream collecting in the pipe G; but no air obtains admission. When the vessel B has been filled with milk and the separator started, cream will run out through the cream-pipe C and skim-milk through the pipe D without these two pipes ever being completely filled or choked by the respective fluids. At the same time a suction will take place in the cream-pipe C, fresh air entering through the air-pipe F to the top shank of the T-pipe E and thence through the cream-pipe C into the separator. The current of fresh air, it will be seen, meets the flow of cream running in the opposite direction, and thus a thorough airing of the cream is effected. The air sucked into the separator is again ejected through the skim-milk pipe D. The cream entering the T-pipe E will collect in the bottom shank G until the weight of the cream on the valve H is sufficient to open it for a moment. A small quantity of cream will then pass through the valve, a column of cream being always maintained in the shank G, the height of this column being regulated by the balance-weight K, so that the inlet of the fresh air into the cream-pipe is not choked by the cream. By this arrangement any access of foul air from the work-room into the cream-pipe is effectually prevented.

Figs. 3 and 4 show a modified design, the vessel M to receive the cream being here provided with a tight-fitting lid N, to which the cream-pipe C is connected through a pipe P. The fresh-air pipe F is here led through the same lid N. The cream in this case runs direct into the receiving vessel M without coming into contact with the air of the work-room, and the fresh air is sucked in through the air-pipe F and the lid N into the cream vessel M and thence through the pipe P to the cream-pipe C and to the separator.

The introduction of the use of this new method of airing by means of my invention should prove useful in every dairy; but its usefulness will be specially apparent in forms where my so-called "cream-freezing system" has been introduced, the chief points of this system being for small farms to separate the milk daily immediately after milking and collecting the cream until a sufficient quantity has been obtained to send a full vessel of cream to a butter-factory, the cream meanwhile being kept in a frozen or semifrozen condition. The troublesome ventilating of the milk as it has hitherto been effected by means of any known ventilating apparatus—viz., as a separate operation by itself before the separation—will now be needless. By adopting my device the airing and the separation of the milk are combined in one operation, thus saving time and work to the milk producers, and the time between the milking and the freezing of the cream is shortened to the smallest possible amount, which of course is beneficial to the quality of the cream.

I declare that what I claim is—

1. An apparatus for ventilating milk and cream during their separation by means of a cream-separator, which apparatus comprises a cream-pipe connected to the cream-separator, a system of tubing connected to said cream-pipe and adapted to communicate with a source of fresh air, means for preventing foreign matter from passing with the air through said system, and means for preventing the admission of air from the work-room into the cream-pipe in combination substantially as described.

2. An apparatus for ventilating milk and cream during their separation by means of a cream-separator, which apparatus comprises a cream-pipe connected to the cream-separator, means for conveying a constant supply of pure air to said cream-pipe, and an automatic counterweighted valve adapted to close the discharge end of said cream-pipe in combination substantially as and for the purpose set forth.

3. An apparatus for ventilating milk and cream during their separation by means of a cream-separator, which apparatus comprises a cream-pipe connected to the cream-separator, a system of tubing connected to said cream-pipe and adapted to communicate with a source of fresh air, means for preventing foreign matter from passing with the air through said system, and an automatic counterweighted valve adapted to close the discharge end of said cream-pipe, in combination, substantially as and for the purpose set forth.

In witness whereof I have hereunto signed my name, this 15th day of April, 1901, in the presence of two subscribing witnesses.

ARTHUR HJALMAR BORGSTRÖM.

Witnesses:
HARRY G. DWIGHT,
H. AHER JOHNSON.